United States Patent [19]

McCormack

[11] Patent Number: 5,855,999
[45] Date of Patent: Jan. 5, 1999

[54] BREATHABLE, CLOTH-LIKE FILM/ NONWOVEN COMPOSITE

[75] Inventor: Ann Louise McCormack, Cumming, Ga.

[73] Assignee: Kimberly-Clark Worldwide, Inc., Neenah, Wis.

[21] Appl. No.: 755,664

[22] Filed: Nov. 25, 1996

Related U.S. Application Data

[60] Continuation of Ser. No. 449,596, May 23, 1995, abandoned, which is a division of Ser. No. 169,826, Dec. 17, 1993, abandoned.

[51] Int. Cl.$^6$ .................................................. B32B 5/16
[52] U.S. Cl. ........................ 428/283; 428/288; 428/290; 428/516; 428/688; 604/370; 604/384
[58] Field of Search ................................. 428/283, 288, 428/290, 516, 688; 604/370, 384

[56] References Cited

U.S. PATENT DOCUMENTS

| | | | |
|---|---|---|---|
| Re. 28,606 | 11/1975 | Ikeda et al. ........................ | 428/155 |
| 1,741,530 | 12/1929 | Mayer . | |
| 2,971,322 | 2/1961 | Bouvet ............................... | 57/140 |
| 3,047,444 | 7/1962 | Harwood ............................ | 154/46 |
| 3,059,313 | 10/1962 | Harmon .............................. | 28/80 |
| 3,256,258 | 6/1966 | Herrman ........................... | 260/93.7 |
| 3,396,071 | 8/1968 | Couzens ............................ | 161/150 |
| 3,406,033 | 10/1968 | Reitz ................................... | 117/7 |
| 3,438,844 | 4/1969 | Kumin .............................. | 161/150 |
| 3,485,695 | 12/1969 | Ness ................................... | 156/229 |
| 3,510,344 | 5/1970 | Dunderdale ........................ | 117/76 |
| 3,575,784 | 4/1971 | Phillips et al. .................... | 161/150 |
| 3,622,434 | 11/1971 | Newman ............................ | 161/128 |
| 3,634,184 | 1/1972 | Wang ................................. | 161/159 |
| 3,640,829 | 2/1972 | Elton ................................. | 161/159 |
| 3,679,538 | 7/1972 | Druin et al. ....................... | 161/159 |
| 3,679,540 | 7/1972 | Zimmerman et al. ............ | 161/159 |
| 3,690,977 | 9/1972 | Loft ................................... | 156/167 |
| 3,725,520 | 4/1973 | Suzuki et al. ..................... | 264/41 |
| 3,772,417 | 11/1973 | Vogt ................................... | 264/230 |
| 3,836,423 | 9/1974 | Wagner et al. .................... | 161/159 |
| 3,844,865 | 10/1974 | Elton et al. ........................ | 156/229 |
| 3,849,241 | 11/1974 | Butin et al. ........................ | 161/169 |
| 3,870,593 | 3/1975 | Elton et al. ........................ | 161/159 |
| 3,881,489 | 5/1975 | Hartwell ............................ | 128/287 |

(List continued on next page.)

FOREIGN PATENT DOCUMENTS

| | | | |
|---|---|---|---|
| 1316314 | 4/1993 | Canada ............................... | C08J 9/26 |
| 19925 | 5/1980 | European Pat. Off. . | |
| 030418 | 6/1981 | European Pat. Off. . | |
| 0066672 A3 | 12/1982 | European Pat. Off. ........... | C08J 5/18 |
| 127483 | 12/1984 | European Pat. Off. . | |
| 180703 | 5/1986 | European Pat. Off. . | |
| 237642 | 9/1987 | European Pat. Off. . | |
| 0 260 131 A2 | 3/1988 | European Pat. Off. ......... | A61L 15/00 |
| 0259128A2 | 3/1988 | European Pat. Off. .......... | B32B 5/22 |
| 0265544A1 | 5/1988 | European Pat. Off. .......... | B32B 7/02 |
| 0 306 818 | 3/1989 | European Pat. Off. . | |
| 0309073A2 | 3/1989 | European Pat. Off. ........ | B23B 27/12 |
| 0330019A | 8/1989 | European Pat. Off. .......... | C08K 3/26 |
| 0434115A | 6/1991 | European Pat. Off. . | |
| 444671 | 9/1991 | European Pat. Off. . | |
| 0454391A2 | 10/1991 | European Pat. Off. ..... | D06M 15/564 |
| 0 227 481 | 8/1992 | European Pat. Off. . | |
| 505027 | 9/1992 | European Pat. Off. . | |
| 549954 | 7/1993 | European Pat. Off. . | |
| 0 556 749 A1 | 8/1993 | European Pat. Off. ........ | A61F 13/15 |
| 554896 | 8/1993 | European Pat. Off. . | |
| 0 569 860 | 11/1993 | European Pat. Off. . | |
| 0105629-B1 | 12/1993 | European Pat. Off. ........ | B29C 67/20 |
| 2205407 | 5/1974 | France . | |
| 1460514 | 2/1969 | Germany . | |
| 2046593 | 11/1971 | Germany . | |
| 2613963 | 10/1977 | Germany . | |
| 2632875 | 11/1977 | Germany . | |
| 2757526 | 6/1979 | Germany . | |
| 3438859 | 7/1985 | Germany . | |
| 3724510-A1 | 2/1989 | Germany ........................ | D06N 7/00 |
| 0038344 | 3/1979 | Japan .............................. | C08K 9/04 |
| 6-1072543A | 4/1986 | Japan ............................. | B32B 05/18 |
| 1079249A | 3/1989 | Japan ............................. | C08K 3/26 |
| 3-097459 | 7/1991 | Japan . | |
| 4-202442 | 7/1992 | Japan . | |
| 4-227260 | 8/1992 | Japan ............................. | A61F 13/15 |
| 5-230251 | 9/1993 | Japan ............................. | C08J 9/00 |
| 1217498 | 12/1970 | United Kingdom . | |
| 1308904 | 3/1973 | United Kingdom . | |
| 1399666 | 7/1975 | United Kingdom . | |
| 1532467 | 11/1978 | United Kingdom . | |
| 2027637 | 2/1980 | United Kingdom .......... | B01D 13/04 |
| 1575972 | 10/1980 | United Kingdom . | |
| 1576436 | 10/1980 | United Kingdom . | |
| 2115702 | 9/1983 | United Kingdom ............ | A61F 13/16 |
| 2149720 | 6/1985 | United Kingdom . | |
| 2151538 | 7/1985 | United Kingdom ............... | C08J 5/18 |
| 2175026 | 11/1986 | United Kingdom . | |
| 2 245 373 | 1/1992 | United Kingdom ............. | D04H 1/42 |
| 2246373 | 1/1992 | United Kingdom ............. | D04H 1/42 |
| 2264258 | 8/1993 | United Kingdom ............. | B29D 7/01 |
| 94/04606 | 3/1994 | WIPO ............................. | C08K 3/00 |

OTHER PUBLICATIONS

Database WPI. Section Ch, Week 8902, Derwent Publications Ltd., London, GB; Class A93, AN 89–011132 & JP,A,63 286 331 (Asahi Chemical Ind KK), 24 Nov. 1988, See Abstract.

WPI Abstract Accession No. 93–0200182/25 & JP050124144A (Unitaka) May 21, 1993 (See Abstract).

WPI Abstract Accession No. 93–022215/03 & JP040348931A (Mitsubishi) Dec. 3, 1992 (See Abstract).

*Primary Examiner*—Mark D. Sweet
*Attorney, Agent, or Firm*—Patrick C. Wilson

[57] ABSTRACT

Disclosed herein is a breathable film and a breathable, cloth-like film/nonwoven composite made from the breathable film which is stretch-thinned and bonded to a fibrous polyolefin nonwoven web. Certain thermoplastic films such as, for example, linear low density polyethylene films are difficult to thermally bond to, for example, polypropylene nonwoven webs due to the incompatibility of the two polymers. The present invention incorporates a bonding agent into one or both of the two layers thereby making it easier to thermally bond the two layers together. Processes for forming the various composite are also disclosed.

6 Claims, 1 Drawing Sheet

U.S. PATENT DOCUMENTS

| | | | |
|---|---|---|---|
| 3,932,682 | 1/1976 | Loft et al. | 428/296 |
| 3,949,128 | 4/1976 | Ostermeier | 428/152 |
| 3,973,063 | 8/1976 | Clayton | 428/35 |
| 4,013,816 | 3/1977 | Sabee et al. | 428/288 |
| 4,041,203 | 8/1977 | Brock et al. | 428/157 |
| 4,086,310 | 4/1978 | Bottenbruch et al. | 264/41 |
| 4,087,486 | 5/1978 | Fielding et al. | 260/897 |
| 4,104,404 | 8/1978 | Bieler et al. | 428/35 |
| 4,154,885 | 5/1979 | Tecl et al. | 428/198 |
| 4,176,148 | 11/1979 | Magder et al. | 264/41 |
| 4,187,210 | 2/1980 | Howard, Jr. | 260/42.14 |
| 4,193,899 | 3/1980 | Brenner et al. | 260/23.5 |
| 4,209,563 | 6/1980 | Sisson | 428/288 |
| 4,254,175 | 3/1981 | Kubat et al. | 428/213 |
| 4,306,559 | 12/1981 | Nishizawa et al. | 128/287 |
| 4,308,303 | 12/1981 | Mastroianni et al. | 428/90 |
| 4,333,979 | 6/1982 | Sciaraffa et al. | 428/179 |
| 4,340,563 | 7/1982 | Appel et al. | 264/518 |
| 4,341,216 | 7/1982 | Obenour | 128/287 |
| 4,342,812 | 8/1982 | Selwood | 428/286 |
| 4,344,999 | 8/1982 | Gohlke | 428/212 |
| 4,347,844 | 9/1982 | Ohki et al. | 128/287 |
| 4,350,655 | 9/1982 | Hoge | 264/145 |
| 4,364,985 | 12/1982 | Tokuyama et al. | 428/149 |
| 4,377,616 | 3/1983 | Ashcraft et al. | 428/213 |
| 4,404,052 | 9/1983 | Persson et al. | 156/73.1 |
| 4,433,026 | 2/1984 | Molde | 428/252 |
| 4,438,228 | 3/1984 | Schenck | 524/109 |
| 4,443,511 | 4/1984 | Worden et al. | 428/198 |
| 4,443,513 | 4/1984 | Meitner et al. | 428/195 |
| 4,452,845 | 6/1984 | Lloyd et al. | 428/220 |
| 4,467,595 | 8/1984 | Kramers | 57/225 |
| 4,472,328 | 9/1984 | Sugimoto et al. | 264/41 |
| 4,486,485 | 12/1984 | Sookne | 428/198 |
| 4,489,543 | 12/1984 | Bromley et al. | 57/208 |
| 4,501,797 | 2/1985 | Super et al. | 428/349 |
| 4,515,854 | 5/1985 | Kogame et al. | 428/288 |
| 4,518,650 | 5/1985 | Grot et al. | 428/286 |
| 4,522,203 | 6/1985 | Mays | 128/132 D |
| 4,533,602 | 8/1985 | Nakamura et al. | 428/447 |
| 4,539,256 | 9/1985 | Shipman | 428/315.5 |
| 4,551,378 | 11/1985 | Carey, Jr. | 428/198 |
| 4,554,121 | 11/1985 | Kramers | 264/103 |
| 4,554,207 | 11/1985 | Lee | 428/288 |
| 4,555,811 | 12/1985 | Shimalla | 2/51 |
| 4,559,050 | 12/1985 | Iskra | 604/368 |
| 4,565,846 | 1/1986 | Saito et al. | 525/101 |
| 4,578,069 | 3/1986 | Whitehead et al. | 604/370 |
| 4,578,307 | 3/1986 | Niki et al. | 428/288 |
| 4,585,604 | 4/1986 | Okuyama et al. | 264/41 |
| 4,595,629 | 6/1986 | Mays | 428/286 |
| 4,606,964 | 8/1986 | Wideman | 428/152 |
| 4,606,970 | 8/1986 | Sharps, Jr. | 428/301 |
| 4,609,584 | 9/1986 | Cutler et al. | 428/156 |
| 4,612,148 | 9/1986 | Motooka et al. | 264/49 |
| 4,613,643 | 9/1986 | Nakamura et al. | 524/426 |
| 4,618,524 | 10/1986 | Groitzsch et al. | 428/198 |
| 4,636,424 | 1/1987 | Amemiya et al. | 428/198 |
| 4,652,487 | 3/1987 | Morman | 428/138 |
| 4,655,760 | 4/1987 | Morman et al. | 604/385 A |
| 4,657,802 | 4/1987 | Morman | 428/152 |
| 4,681,793 | 7/1987 | Linman et al. | 428/138 |
| 4,692,369 | 9/1987 | Nomi | 428/198 |
| 4,696,799 | 9/1987 | Noe | 422/148 |
| 4,698,372 | 10/1987 | Moss | 521/145 |
| 4,702,954 | 10/1987 | Duncan | 428/213 |
| 4,704,238 | 11/1987 | Okuyama et al. | 264/41 |
| 4,713,069 | 12/1987 | Wang et al. | 604/378 |
| 4,720,415 | 1/1988 | Vander Wielen et al. | 428/152 |
| 4,725,473 | 2/1988 | Van Gompel et al. | 428/156 |
| 4,725,481 | 2/1988 | Ostapchenko | 428/213 |
| 4,726,999 | 2/1988 | Khoyama et al. | 428/516 |
| 4,728,564 | 3/1988 | Akagi et al. | 428/247 |
| 4,734,311 | 3/1988 | Sokolowski | 428/152 |
| 4,753,840 | 6/1988 | Van Gompel | 428/171 |
| 4,758,239 | 7/1988 | Yeo et al. | 604/366 |
| 4,761,322 | 8/1988 | Raley | 428/198 |
| 4,761,324 | 8/1988 | Rautenberg et al. | 428/198 |
| 4,767,580 | 8/1988 | Shingo et al. | 264/41 |
| 4,769,273 | 9/1988 | Hoeschele et al. | 428/215 |
| 4,772,444 | 9/1988 | Curro et al. | 264/557 |
| 4,777,073 | 10/1988 | Sheth | 428/155 |
| 4,778,720 | 10/1988 | Engel | 428/336 |
| 4,781,966 | 11/1988 | Taylor | 428/152 |
| 4,786,353 | 11/1988 | Templeton et al. | 156/359 |
| 4,789,699 | 12/1988 | Kieffer et al. | 524/271 |
| 4,793,956 | 12/1988 | Nogiwa et al. | 264/41 |
| 4,794,128 | 12/1988 | Kawaguchi et al. | 521/138 |
| 4,801,491 | 1/1989 | Tanaka et al. | 428/212 |
| 4,810,571 | 3/1989 | Guthrie | 428/286 |
| 4,814,124 | 3/1989 | Aoyama et al. | 264/41 |
| 4,815,714 | 3/1989 | Douglas | 264/22 |
| 4,816,330 | 3/1989 | Freund et al. | 428/286 |
| 4,818,593 | 4/1989 | Engel | 428/220 |
| 4,823,350 | 4/1989 | Ito et al. | 604/372 |
| 4,824,718 | 4/1989 | Hwang | 428/284 |
| 4,829,096 | 5/1989 | Kitamura et al. | 521/79 |
| 4,832,886 | 5/1989 | Douglas | 264/41 |
| 4,833,026 | 5/1989 | Kausch | 428/315.5 |
| 4,833,172 | 5/1989 | Schwarz et al. | 521/62 |
| 4,847,145 | 7/1989 | Matsui | 428/323 |
| 4,855,181 | 8/1989 | Shimo et al. | 428/336 |
| 4,863,779 | 9/1989 | Daponte | 428/152 |
| 4,863,792 | 9/1989 | Mrozinski | 428/315.5 |
| 4,868,928 | 9/1989 | Norvell | 2/272 |
| 4,878,974 | 11/1989 | Kagawa | 156/85 |
| 4,879,078 | 11/1989 | Antoon, Jr. | 264/41 |
| 4,883,549 | 11/1989 | Frost et al. | 156/161 |
| 4,891,258 | 1/1990 | Fahrenkrug | 428/138 |
| 4,900,623 | 2/1990 | Kohn | 428/336 |
| 4,902,553 | 2/1990 | Hwang et al. | 428/156 |
| 4,908,251 | 3/1990 | Iimura et al. | 428/68 |
| 4,921,652 | 5/1990 | Tsuji et al. | 264/41 |
| 4,921,653 | 5/1990 | Aoyama et al. | 264/41 |
| 4,923,650 | 5/1990 | Antoon, Jr. et al. | 264/41 |
| 4,925,732 | 5/1990 | Driskill et al. | 428/336 |
| 4,929,303 | 5/1990 | Sheth | 156/209 |
| 4,929,492 | 5/1990 | Carey, Jr. et al. | 428/198 |
| 4,935,287 | 6/1990 | Johnson et al. | 428/198 |
| 4,939,008 | 7/1990 | Kemski | 428/34.3 |
| 4,942,214 | 7/1990 | Sakhpara | 528/59 |
| 4,961,985 | 10/1990 | Henn et al. | 428/196 |
| 4,970,104 | 11/1990 | Radwanski | 428/198 |
| 4,981,747 | 1/1991 | Morman | 428/198 |
| 4,983,450 | 1/1991 | Yanagihara et al. | 428/283 |
| 5,008,296 | 4/1991 | Antoon, Jr. et al. | 521/91 |
| 5,011,698 | 4/1991 | Antoon, Jr. et al. | 426/395 |
| 5,026,591 | 6/1991 | Henn et al. | 428/198 |
| 5,110,670 | 5/1992 | Janocha et al. | 428/216 |
| 5,116,662 | 5/1992 | Morman | 428/198 |
| 5,120,813 | 6/1992 | Ward, Jr. | 528/28 |
| 5,143,679 | 9/1992 | Weber et al. | 264/288.8 |
| 5,149,332 | 9/1992 | Walton et al. | 604/358 |
| 5,158,819 | 10/1992 | Goodman, Jr. et al. | 428/131 |
| 5,164,248 | 11/1992 | Fleury et al. | 428/220 |
| 5,169,712 | 12/1992 | Tapp | 428/315.5 |
| 5,173,235 | 12/1992 | Kamei et al. | 264/154 |
| 5,176,953 | 1/1993 | Jacoby et al. | 428/315.5 |
| 5,190,812 | 3/1993 | Joseph et al. | 428/297 |
| 5,204,174 | 4/1993 | Daponte et al. | 428/286 |
| 5,208,098 | 5/1993 | Stover | 428/284 |
| 5,236,963 | 8/1993 | Jacoby et al. | 521/92 |

| | | | |
|---|---|---|---|
| 5,238,618 | 8/1993 | Kinzer | 264/41 |
| 5,238,623 | 8/1993 | Mrozinski | 264/48 |
| 5,238,636 | 8/1993 | Furukawa et al. | 264/41 |
| 5,244,482 | 9/1993 | Hassenboehler, Jr. et al. | 55/528 |
| 5,244,716 | 9/1993 | Thornton et al. | 428/198 |
| 5,246,647 | 9/1993 | Beck et al. | 264/41 |
| 5,252,385 | 10/1993 | Kagawa et al. | 428/220 |
| 5,261,899 | 11/1993 | Visscher et al. | 604/367 |
| 5,266,403 | 11/1993 | Cray et al. | 427/387 |
| 5,308,904 | 5/1994 | Fujii et al. | 524/232 |
| 5,317,035 | 5/1994 | Jacoby et al. | 521/143 |
| 5,340,646 | 8/1994 | Morita et al. | 428/307.3 |
| 5,616,420 | 4/1997 | Yamaoka et al. | 428/515 |

BREATHABLE, CLOTH-LIKE FILM/ NONWOVEN COMPOSITE

This application is a continuation of application Ser. No. 08/449,596, now abandoned, entitled "BREATHABLE CLOTH-LIKE FILM/NONWOVEN COMPOSITE" and filed in the U.S. Patent and Trademark Office on May 23, 1995, which is a divisional of application Ser. No. 08/169,826, now abandoned, entitled "BREATHABLE CLOTH-LIKE FILM/NONWOVEN COMPOSITE" and filed in the U.S. Patent and Trademark Office on Dec. 17, 1993. The entirety of this Application is hereby incorporated by reference.

FIELD OF THE INVENTION

The present invention is directed to breathable films and breathable, cloth-like film/nonwoven composites as well as the process for forming them. More specifically the present invention is directed to breathable film/nonwoven laminates which contain a thin, breathable film laminated at distinct points to a reinforcing, cloth-like fibrous nonwoven web. The present invention has applicability in a wide variety of areas where strength, comfort, breathability and liquid impermeability are needed or desired. Two specific areas of use include personal care absorbent articles and health care related items including drapes, gowns and other related surgical supplies. Examples of personal care absorbent articles include diapers, sanitary napkins, incontinence garments, training pants, bandages and the like. The material of the present invention also may be used to form all or a portion of an article of clothing.

BACKGROUND OF THE INVENTION

Many of today's products include man-made, synthetic components, personal care absorbent articles such as diapers being but one example. Today's diapers typically include a synthetic fiber nonwoven web as the body side liner material positioned adjacent the baby's skin. Inside the diaper there is an absorbent core which may be made from natural wood pulp fiber in combination with synthetic fibers and superabsorbents. The backing materials or outercovers of diapers have traditionally been made from plastic films due to cost considerations and the liquid impermeable nature of plastic films.

While plastic films are efficient at containing liquids and other waste matters during use, the same plastic films have certain disadvantages in that they are not pleasing to the touch and they do not readily pass water vapor so that, from a wearer wellness standpoint, plastic films tend to cause skin hydration thereby making infants more prone to diaper rash. One solution has been to supplant normal nonporous plastic films with breathable plastic films as the diaper backing material. There are a number of ways of making a film breathable including aperturing and the use of fillers. When fillers are used, the film is often crushed between rollers to crack the filler or stretched so as to create small gaps between the polymer and the particles embedded in the polymer. This creates a tortuous path from one surface of the film to the other and thus provides a path for the escape of water vapor while acting as a barrier to liquids such as water and urine. Polyolefin films are often used for making breathable films. A particularly useful film for such applications is made from a linear polyolefin containing organic and/or inorganic fillers. Such filled polyolefin films provide good water vapor transmission thereby making the diapers more comfortable to the wearer. As a result, the relative humidity and temperature within the diaper or other product can be reduced by using breathable materials. Despite this, such breathable films have the disadvantage of being cold and clammy because breathable films pass moisture to the outside of the product where it condenses readily on the film surface. Consequently, another solution has been to attempt to use nonwoven materials as the backing material for diapers.

Fibrous nonwoven webs when used as the backing material for diapers alleviate the above-mentioned film problems, however, such fibrous nonwoven webs generally provide poor barriers to the passage of liquids including urine. As a result, most nonwovens, by themselves, are not suitable as backing materials. Some fibrous nonwoven webs work better than others at repelling liquids, especially when they include a layer of fine fiber nonwoven material such as a layer of meltblown. Meltblown fibrous webs are made from fibers formed by extruding molten thermoplastic material through fine die capillaries to form molten threads or filaments which are then attenuated using high velocity gas. The resultant fibers generally have very small diameters, usually 10 microns or less, and are collected on a forming surface in the form of a fibrous nonwoven batt with very small pore structures which tend to inhibit liquid flow. See for example U.S. Pat. No. 3,849,241 to Buntin et al. Even with the use of meltblown layers, however, such fibrous nonwovens do not always prove to be totally suitable as a backing material for personal care products.

In view of the foregoing deficiencies of both films and fibrous nonwovens, attempts have been made to combine the two materials thereby making it possible to rely upon the strengths of one material to overcome the weaknesses of the other. An example of combining the best attributes of a breathable film and a fibrous nonwoven is via the combination of a filled linear polyolefin film and a polypropylene or polypropylene copolymer spunbond web. In order for these two materials to work in unison, they must somehow be joined or laminated to one another. There are a number of methods for joining films and nonwovens including thermal and ultrasonic bonding, gluing, needling and sewing. For purposes of maintaining a liquid barrier, needling and sewing are generally undesirable due to the fact that the holes these processes create are relatively large and therefore permit leakage of liquids. Adhesives and gluing can be undesirable for their own reasons including undue blockage of the breathable film pores and overall stiffness of the laminate. Lamination of the film and fibrous nonwoven layers should be relatively complete. As a general matter, to achieve good lamination between a film and a nonwoven using an adhesive, either a thin, uniform layer of adhesive must be sprayed across the entire interface of the two materials or larger more localized quantities of adhesive must be used at spaced-apart intervals. Uniform applications of adhesive can and often do block the pores on one surface of the film thereby rendering the previously porous film nonporous. This is not desirable. Using larger quantities of adhesive in more localized areas reduces the amount of film surface that is being blocked by the adhesive, the drawback being that the film/nonwoven laminate tends to become stiff due to the concentrated application of adhesive. Consequently, it would be more desirable to use thermal lamination techniques.

Thermal lamination can be accomplished through the use of heat and pressure as with heated pattern rolls and with ultrasonics. Both techniques are very well suited for joining films and nonwovens when the two materials are made from the same polymer. In some cases, however, the polymers used to make the film are not the same as those used to make the fibrous nonwoven web. This can be because of both cost and physical properties. Linear low density polyethylene (LLDPE) films and polypropylene nonwoven webs are one example. These polymers are thermally incompatible with one another in that they cannot be thermally laminated to one another with a bond force of at least 5 grams. There also exists the situation where the polymers used to make the two layers are the same and therefore compatible but to bring about thermal lamination so much heat and pressure must be used that perforations end up being formed in the film layer and oftentimes the laminate is too stiff. As a result, there is a need for a process for thermally bonding such incompatible and compatible materials so that the advantages of the two materials as well as the thermal lamination process can be used. There is also a need for the resultant product. As explained in detail below, these needs have been satisfied by the present invention.

SUMMARY OF THE PRESENT INVENTION

The foregoing disadvantages have been overcome by the way of the present invention. Disclosed herein is a breathable film and a breathable, cloth-like film/nonwoven composite made from a breathable film which is thermally bonded to a fibrous polyolefin nonwoven web. The processes for the foregoing materials are also disclosed.

Ideally, heat bonding is one of the most desired means for laminating a film and a nonwoven layer. Heat bonding requires that the materials be thermally compatible. Oftentimes films and nonwovens are each made from polymers which provide the desired characteristics for the particular material in question but which are not easily heat bondable to each other or at all. In the case of the present invention, a bonding agent is added to the film which needs only to be compatible with the polyolefin polymer portion of the fibrous nonwoven web as it acts as a heat and pressure sensitive adhesive during the laminating process. Alternatively, the bonding agent can be incorporated into the fibers of the fibrous nonwoven web to aid in the lamination of the film and web. It is important that the temperature used to bond the two layers together be less than the melting point of the polyolefin polymer of the film or fiber in order to maintain the integrity of the film or fiber, thereby reducing the risk of forming pinholes and losing strength during the laminating process. Thus it is important to the present invention that the film or fiber in its entirety not be allowed to reach its overall melting point and thereby compromise the integrity and barrier properties of the resulting composite. By "localizing" heat bonding via the bonding additive and a discrete bond pattern, a means is provided to secure attachment with minimal damage to the porous nature of the breathable film while at the same time maintaining good flexural characteristics with respect to the overall composite or laminate.

In one embodiment of the present invention, the breathable film/nonwoven laminate is created by first forming a film from a blend including, on a dry weight basis based upon the total weight of the film, from about 10 to about 68% of a predominately linear polyolefin polymer, from about 30 to about 80% of a filler having an average particle size range of from about 0.5 to about 5 micrometers and from about 2 to about 20% of a bonding agent. The film is then stretched or crushed between rollers to make it breathable. The film once formed should have a water vapor transmission rate of at least 100 grams per square meter for 24 hours. Next a fibrous polyolefin nonwoven web is thermally laminated to the film to form a laminate or composite. The laminate should require at least a 5 gram load to delaminate the two layers from one another.

Suitable materials for the film layer include, but are not limited to, a predominately liner polyolefin polymer such as linear low density polyethylene and fillers such as calcium carbonate. Suitable materials for the fibrous nonwoven web include, but are not limited to, polypropylene and blends of polyolefins such as polypropylene fibers and liner low density polyethylene fibers as well as bicomponent fibers with a polyolefin component forming an exterior surface of the fibers.

The process involves first forming a preextrusion blend of the aforementioned polymers and then extruding the blend into a film. Once the film has been formed, it is stretched at a temperature less than the melting point of the predominately linear polymer portion of the film and more desirably at a temperature which is also less than the softening point of the bonding agent. By stretching the film, the film is thinned and made porous and breathable. The film, once stretched, should have a water vapor transmission rate of at least 100 grams per square meter for 24 hours. Next, the film is bonded to the fibrous polyolefin nonwoven web at a temperature less than the melting point of the predominately linear polymer portion of the film to form a laminate. Additionally, if so desired, the film layer may be caused to retract after bonding to the nonwoven layer thereby causing the overall composite to retract which in turn, creates an undulating surface and a bulkier composite.

The breathable, cloth-like film/nonwoven composite once formed has a variety of uses not the least of which is as an outercover for personal care absorbent articles. Such articles will typically include a body side liner and an outercover with an absorbent core disposed therebetween. The material of the present invention can be used as the outercover with the fibrous nonwoven layer facing towards the exterior surface of the product and with the film layer being positioned adjacent the absorbent core.

As an alternative, if thermal bonding is desired but the polymers forming all or a portion of the film and support layers are thermally incompatible, a bonding agent can be added to the fibrous nonwoven web support layer instead of or in addition to the film layer. The bonding agent can be added to the polymer mix forming the fibers. When the fibers are single component fibers, the bonding agent can be added to the entire fiber. Besides single component fibers, it is also possible to form the fibrous nonwoven web support layer entirely or partially from multi-component fibers such as bicomponent fibers. Examples of bicomponent fibers include, but are not limited to, sheath/core fibers, side-by-side fibers and islands-in-the-sea fibers. In addition, biconstituent fibers can be used to form the fibrous nonwoven support layer. With all such fiber configurations, the bonding agent should be present in a portion of the fiber which forms at least a part of the exterior surface of the fiber so that the bonding agent may contact and bond with a portion of the film layer. Once the fibrous nonwoven web support layer has been formed, it can be thermally bonded to the film layer using heat, pressure, heat and pressure and/or ultrasonics.

DETAILED DESCRIPTION OF THE INVENTION

The present invention is directed to an improved film/nonwoven laminate which utilizes a film which is comprised of a predominately linear polyolefin polymer, a filler and a bonding agent and which is thermally bonded to a polyolefin-based fibrous nonwoven web. As an example, traditional linear low density polyethylene films are not heat bondable to polypropylene-based nonwoven webs due to the incompatibility of the polymers and melting points making up the film and nonwoven layers. The present invention provides a breathable film which, due to the unique composition and processing conditions, is thermally bondable to a polyolefin-based nonwoven web. In a specific embodiment, a breathable film using a blend of linear low density polyethylene and a bonding agent is thermally bonded to a polypropylene nonwoven web. The resultant laminate provides several features including a soft, cloth-like feel on one exterior surface and good water vapor permeability while still acting as a barrier to the passage of liquids. In addition, due to the high stretching and filling of the linear low density polyethylene film, the film is breathable, very soft to the touch and has very little "noise" or "rattle". As a result, while not meaning to be limited to the specific uses as herein specified, the laminate of the present invention has particular use as a backing material for personal care absorbent products including diapers, sanitary napkins, training pants, incontinence garments, bandages and the like. The material of the present invention also may be used to form all or a portion of an article of clothing. In addition, the material of the present invention may be used to form all or a portion of hospital supplies such as surgical drapes, gowns, scrubs, shoe covers, face masks and hats. Consequently, these and other uses are contemplated to be within the scope of the present invention.

In another embodiment, the bonding agent may be added to the fibrous nonwoven web and in particular to the polymer blend forming at least a portion of the exterior surface of a plurality of the fibers making up the nonwoven web. As a result, another means can be provided for thermally bonding or laminating two layers which would otherwise be thermally incompatible. The resultant laminates would also be suitable for the uses outlined above.

Figure 1:
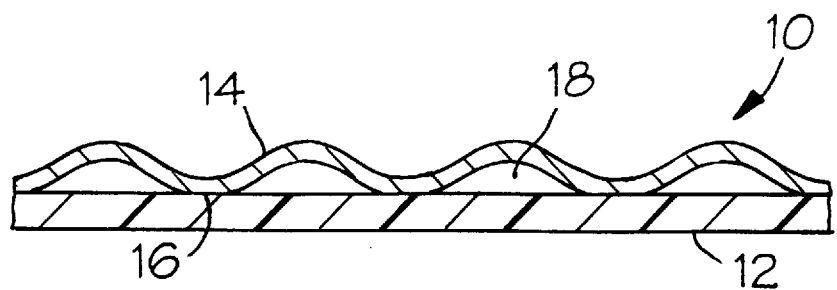
FIG. 1 is a cross-sectional view of a breathable, cloth-like film/nonwoven composite according to the present invention.

Referring to FIG. 1, the composite or laminate 10 of the present invention in its most basic form includes a film layer 12 and a fibrous polyolefin nonwoven web comfort and support layer 14 which have been thermally bonded to one another. While this is the most basic configuration of the present invention, additional layers of material may be added to the composite 10 to form multilayered composites if so desired. For example, a second fibrous polyolefin nonwoven web (not shown) may be bonded to the film layer 12 on a side of the film opposite the first fibrous polyolefin nonwoven web 14.

The film layer 12 includes three basic components, the first being a predominately linear polyolefin polymer such as a linear low density polyethylene, the second being a filler and the third being a bonding or tackifying agent. These three components are mixed together, heated and then extruded into a film layer using any one of a variety of film-producing processes known to those of ordinary skill in the film art including casting and blowing. Other additives and ingredients may be added to the film layer provided they do not seriously interfere with the ability of the film to breath and thermally bond with the fibrous polyolefin nonwoven web comfort layer 14. Generally, on a dry weight basis, based upon the total weight of the film, the film layer will include from about 10 to about 68 weight percent of the predominately liner thermoplastic polymer, about 2 to about 20 weight percent of a bonding agent and from about 30 to about 80 weight percent filler. In more specific embodiments it may additionally include from 0 to about 68 percent by weight of another polyolefin such as polypropylene.

Linear low density polyethylene (LLDPE) has been found to work quite well as a film base when appropriate amounts of a bonding agent are blended in with the linear low density polyethylene. However, it is believed that any predominately linear polyolefin polymer can be used with the present invention. As used herein, "linear low density polyethylene" is meant to include polymers of ethylene and higher alpha olefin comonomers such as $C_3$–$C_{12}$ and combinations thereof. By "predominately linear" it is meant that the main polymer chain is linear with less than approximately 5 long chain branches per 1000 ethylene units. Long chain branches would include carbon chains greater than $C_{12}$. For predominately linear polyolefin polymers that are nonelastic, short chain branching ($C_3$–$C_{12}$) due to comonomer inclusion will typically be limited to less than 20 short chains per 1000 ethylene units and 20 or greater for polymers which are elastomeric. Examples of predominately linear polyolefin polymers include, but are not limited to, linear polyolefins such as ethylene, propylene, 1-butene, 4-methyl-pentene, 1-hexane, 1-octene and higher olefins as well as copolymers of the foregoing. In addition, copolymers of ethylene and other olefins including pentene, hexane, heptene, octene, decene, etc., would also be examples of predominately linear thermoplastic polymers.

A main purpose of the present invention is to provide a means for thermally bonding breathable films made from such predominately linear polyolefin polymers to fibrous polyolefin nonwoven webs in a manner which will not destroy the integrity of the individual layers and especially the film layer. By adding a bonding agent to the film polymer blend in a specified range, the film and nonwoven can be bonded at lower temperatures and/or pressures with lower percentages of overall bond area. In addition, incompatible films and nonwoven webs such as LLDPE films and polypropylene nonwoven webs can now be effectively laminated. The laminate once created is still very soft and generally devoid of undeliberate perforations caused by excessive bonding to achieve appropriate lamination.

For a LLDPE film and a polypropylene nonwoven web to be compatible it would be desirable to be able to thermally bond the two layers at a temperature at or below the melting point of the LLDPE film with an overall bond area at or about 15% and have the resultant laminate be strong enough to require at least a 5 gram load to delaminate the layers using the bond strength test outlined below. By adding a bonding agent to the film polymer blend, this is possible. A "bonding agent" as used herein means an additive which, when incorporated into the film polymer blend, will allow bonding of the film layer to the nonwoven layer at a temperature at least 5° F. lower than the melting point of the primary predominately linear thermoplastic polymer component in the film polymer blend—in this case, the "primary" polymer being the linear low density polyethylene. In addition, the bonding or peel strength of the resultant laminate should be at least 5 grams.

Bonding agents can also be referred to as tackifying resins and are discussed in U.S. Pat. No. 4,789,699 to Kieffer et al., the contents of which is incorporated herein by reference in its entirety. The purpose of the bonding agent of the present invention is to permit bonding of the film and nonwoven layers at a lower temperature. Examples of bonding agents include hydrogenated hydrocarbon resins such as REGALREZ® series tackifiers and ARKON® P series tackifiers. REGALREZ® tackifiers are available from Hercules, Incorporated of Wilmington, Del. REGALREZ® tackifiers are highly stable, light-colored, low molecular weight, nonpolar resins. Grade 3102 is said to have a softening point of 102 R&B° C., a specific gravity at 21° C. of 1.04, a melt viscosity of 100 poise at 149° C. and a glass transition temperature, Tg, of 51° C. REGALREZ® 1094 tackifier is said to have a softening point of 94° C., a specific gravity at 21° C. of 0.99, a melt viscosity of 100 poise at 126° C. and a glass transition temperature, Tg, of 33° C. Grade 1126 is said to have a softening point of 126° C., a specific gravity at 21° C. of 0.97, a melt viscosity of 100 poise at 159° C. and a glass transition temperature, Tg, of 65° C.

ARKON® P series resins are synthetic tackifying resins made by Arakawa Chemical (U.S.A.), Incorporated of Chicago, Ill. from petroleum hydrocarbon resins. Grade P-70, for example, has a softening point of 70° C., while grade P-100 has a softening point of 100° C. and Grade P-125 has a softening point of 125° C.

ZONATEC® 501 lite resin is another tackifier which is a terpene hydrocarbon with a softening point of 105° C. made by Arizona Chemical Company of Panama City, Fla. EASTMAN® 1023PL resin is an amorphous polypropylene tackifying agent with a softening point of 150–155° C. available from Eastman Chemical Company Longview, Tex.

Generally, other examples of bonding agents include, but are not limited to, polyamides, ethylene copolymers such as ethylene vinyl acetate (EVA), ethylene ethyl acrylate (EEA), ethylene acrylic acid (EAA), ethylene methyl acrylate (EMA) and ethylene normal-butyl acrylate (ENBA), wood rosin and its derivatives, hydrocarbon resins, polyterpene resins, atactic polypropylene and amorphous polypropylene. Also included are predominately amorphous ethylene propylene copolymers commonly known as ethylene-propylene rubber (EPR) and a class of materials referred to as toughened polypropylene (TPP) and olefinic thermoplastic polymers where EPR is mechanically dispersed or molecularly dispersed via in-reactor multistage polymerization in polypropylene or polypropylene/polyethylene blends.

It should be understood that the foregoing list of bonding or tackifying agents is illustrative only and not meant to limit the scope of the present invention. Any bonding agent which: is blendable with the other film and/or fiber polymers; is capable of permitting the bonding of the film layer to the nonwoven layer at temperatures at least 5° C. lower than the melting temperature of the primary predominately linear thermoplastic polymer component of the film or fiber blend; and, is capable of creating a bond between the layers which requires at least a 5 gram load to separate the layers, is considered to be a bonding agent for purposes of the present invention. Generally the bonding agent will comprise from about 2 to about 20 percent of the total weight of the film. While weight percentages outside the range can be used, at higher percentages the breathability of the film becomes compromised which, for personal care absorbent articles configurations, is generally not desirable.

In addition to the predominately linear polyolefin polymer and the bonding agent, the film layer also includes a filler. As used herein a "filler" is meant to include particulates and other forms of materials which can be added to the film polymer extrusion blend and which will not chemically interfere with or adversely affect the extruded film but which are able to be uniformly dispersed throughout the film. Generally the fillers will be in particulate form and usually will have somewhat of a spherical shape with average particle sizes in the range of about 0.1 to about 7 microns. Both organic and inorganic fillers are contemplated to be within these scope of the present invention provided that they do not interfere with the film formation process, the breathability of the resultant film or its ability to thermally bond to the fibrous polyolefin nonwoven web or comfort layer. Examples of fillers include calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, pulp powder, wood powder, cellulose derivative, chitin and chitin derivatives.

As mentioned previously, films may be formed using any one of the conventional processes known to those familiar with film formation. The predominately linear polyolefin polymer, bonding agent and filler are mixed in appropriate proportions given the ranges outlined above and then heated and extruded into a film. In order to provide uniform breathability as reflected by the water vapor transmission rate of the film, the filler should be uniformly dispersed throughout the polymer blend and, consequently, throughout the film itself. For purposes of the present invention, a film is "breathable" if it has a water vapor transmission rate of at least 100 $g/m^2/24$ hours as calculated using the test method outlined below with respect to the examples. Generally, once the film is formed, it will have a weight per unit area of less than about 100 grams per square meter and after stretching and thinning its weight per unit area will be less than about 35 grams per square meter and more desirably less than about 18 grams per square meter.

The film used in the examples below was a blown film, however, other types of films are also considered to be within the scope of the present invention provided the forming technique is compatible with filled films. The film as initially formed is generally too thick and too noisy as it tends to make a "rattling" sound when shaken and the film does not yet have a sufficient degree of breathability as measured by its water vapor transmission rate. Consequently, the film is heated to a temperature at least about 5° C. less than the melting point of the predominately linear thermoplastic polymer and then stretched to at least about 2.5 times its original length to thin the film and make it porous. More desirably the temperature to which the film is heated during stretching is also less than the softening point of the bonding agent. For some bonding agents the softening point is given as a range. As a result, "heating below the softening point" would be at a temperature lower than the highest temperature given in the range.

An additional feature of the thinning process is the change in opacity of the film. As formed, the film is relatively transparent but after stretching, it becomes opaque. In addition, while the film becomes oriented during the stretching process, it also becomes softer and it does not have the degree of "rattle" that it does prior to stretching. Taking all these factors into consideration, and the desire to have a water vapor transmission rate of at least 100 grams per square meter per 24 hours, the film should be thinned to such an extent that it has a weight per unit area of less than about 35 grams per square meter for personal care absorbent article applications and more desirable less than about 18 grams per square meter.

The fibrous nonwoven comfort layer 14 is made from polyolefin fibers such as polypropylene. In the examples the nonwoven web is a polypropylene spunbond web but other polyolefin fibers can be used too. Blends or mixes of fibers are also possible including different polyolefin fibers and blends of polyolefin and non-polyolefin fibers such as polyethylene sheath/polypropylene core bicomponent fibers and polyester fibers. Natural fibers also may be included in the fibrous nonwoven web. Specific fiber types include single component fibers and multicomponent fibers such as side-by-side, sheath/core and islands-in-the-sea bicomponent fibers. The fibers may be straight or crimped, hollow or solid. They may have generally circular or non-circular cross-sections including bilobal, trilobal and "X" cross-sections. Fiber lengths may be short as with staple fibers or long as with spunbond and meltblown fibers. Fiber thicknesses will depend upon the desired properties. Narrow fibers will produce a softer nonwoven web while thicker fibers will provide more strength and resilience. Alternatively, blends of fiber diameters can be used. For personal care absorbent article applications, fiber diameters will typically range between about 1 and about 5 denier. For purposes of the present invention, a "polyolefin-based fibrous nonwoven web" and a "fibrous polyolefin nonwoven web" collectively refer to a fibrous nonwoven web wherein at least about 50% of the surface area of the fibers in the web constitute a polyolefin.

A variety of nonwoven web forming processes can be used with the present invention. Examples include, but are not limited to, air and wet laying, staple fiber carding and bonding, solution spinning, meltblowing and spunbonding processes. All of the foregoing processes are well known to those having ordinary skill in the art. Spunbonded polypropylene webs work particularly well with the present invention. Spunbond webs can be made in accordance with the teachings of commonly assigned U.S. Pat. No. 4,340,563 to Appel which is incorporated herein by reference in its entirety. Spunbond materials are made by extruding molten thermoplastic material as filaments through a plurality of capillaries in a spinneret with the diameter of the extruded filaments then being reduced by, for example, eductive drawing or other well known spunbonding mechanisms.

Once the fibrous nonwoven web comfort layer 14 has been formed it can be prebonded for added strength and integrity. The polypropylene spunbond web used in the examples was prebonded using a point bond pattern with a surface bond area of approximately 15% using a bond density of between about 100 and 300 bond points per square inch. Bond densities above and below this range also can be used with the specific density being dependent upon the size of the individual bond points.

Figure 2:
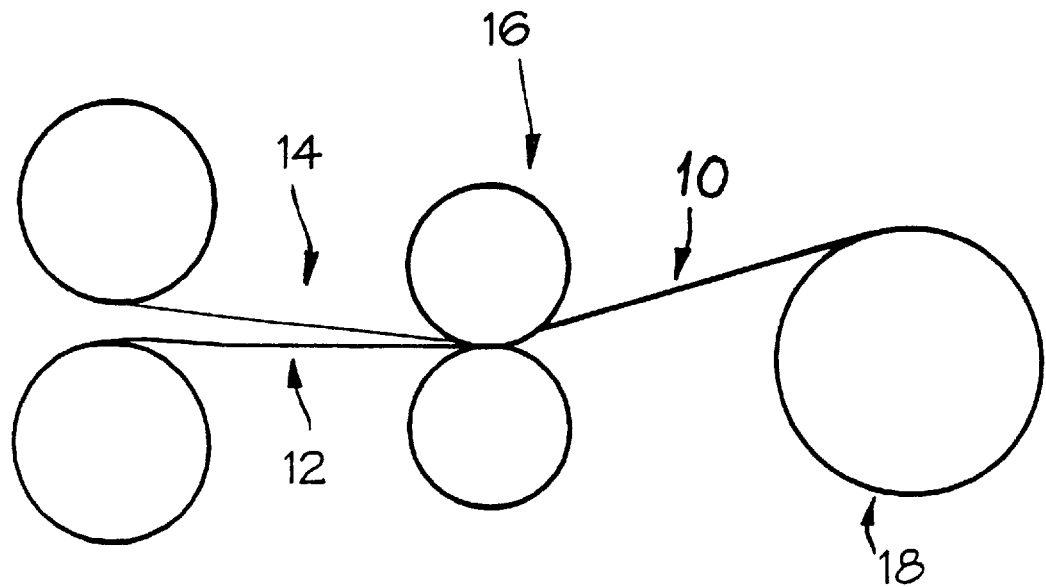
FIG. 2 is a schematic view of a process for forming a breathable, cloth-like film/nonwoven composite according to the present invention.

To form the breathable, cloth-like film/nonwoven composite 10 of the present invention, the film layer 12 and the fibrous polyolefin nonwoven layer 14 are brought into contact with one another and then are thermally bonded together using a bonding means 16 as shown in FIG. 2 of the drawings. Typically the film will have been extruded, stretched and thinned and then wound up on a roll 20 prior to being incorporated into the composite. Alternatively, the film can be wound on a roll in an unstretched state and then stretched and thinned as it is fed into the process. As yet a further alternative, the film can be formed and stretched in line.

The fibrous nonwoven web also can be preformed and unwound from a supply roll 22 into the bonding process. Alternatively, it too can be formed in line. If the film 12 and nonwoven web 14 are fed into the bonder 16 at the same speed, a composite 10 will be formed that will be relatively two-dimensional. Alternatively, the composite 10 can be caused to retract thereby producing an undulating, thicker, more three-dimensional structure. One way of causing this retraction is to place one of the two layers under tension during the bonding process as by speeding up and/or braking one of the layers so that it is temporarily stretched or expanded. Once the bonding has been completed, the stretching or braking forces are removed and the composite retracts thereby causing the undulations. Another way is to use the stressed state of the oriented linear polyolefin molecules within the film layer. As a result of applying heat to the film layer 12, it will oftentimes want to retract. Consequently, if the composite 10 is wound up on a take-up roll 18 at a speed less than the speed of the composite at the bonder 16, the film will relax thereby causing undulations.

Thermal bonding of the two layers together can be accomplished by at least two methods. The first is using heat and pressure as with heated, patterned bonding rolls. Both rolls may be patterned or one may be patterned and the other may be smooth. One or both of the rolls may be heated or a secondary heat source may be used. If conditions dictate, one of the rolls may be cooled. In any event, the heat should be adjusted so that the bonding agent in the film becomes tacky to bond the two layers together while still maintaining the temperature at least about 5° C. cooler than the melting point of the primary predominately liner polyolefin polymer in the film. By "primary" it is meant the predominately linear polyolefin polymer having the highest weight percent of the total weight of the film if there is more than one predominately linear polyolefin polymer in the film polymer blend.

Bond patterns and area may be varied depending upon the particular end-use. Suitable bond patterns can include point bonds, continuous lines, decorative patterns and combinations of the foregoing. Bond area will depend upon the degree of lamination desired. For personal care absorbent article applications, bonding should be sufficient to require at least a 5 gram load to delaminate the two layers.

The second method of bonding is ultrasonic bonding which also is well known to those having ordinary skill in the art. Here again the anvil roll can be designed with any of the bond patterns described above.

The composite once formed can be used for a wide variety of applications not the least of which is an outercover for personal care absorbent articles. Such articles typically include a body side liner, an absorbent core and a backing layer or outercover. The material of the present invention can be used as the outercover with the fibrous nonwoven web layer facing the exterior of the article and the film layer facing the absorbent core. Many times the outercover and body side liner are joined to one another so as to encapsulate the absorbent core. Oftentimes the body side liner is also made from a fibrous polyolefin nonwoven web. As a result, because of the bonding agent, the film layer and bodyside liner can be heat sealed together in the same fashion as the two layers of the composite material of the present invention.

In the foregoing discussion, the bonding agent was added to the film layer 12 to make it compatible with the fibrous nonwoven web comfort and support layer 14. It is also possible, however, to add the bonding agent to the fibers of the support layer 14.

As mentioned previously, the fibers forming layer 14 can be short staple fibers or longer more continuous fibers as with spunbond and meltblown webs. In all cases, it is possible to make the fibers from a single polymer as in a straight polyolefin fiber or from a multi-component fiber such as a bicomponent fiber. With both types of fibers, the bonding agent must be present on the exterior surface of the fibers so that bonding between the film and nonwoven layers can be achieved. With straight fibers, such as polyethylene fibers, the bonding agent can be added to the polyethylene premix and extruded into the fibers. For bicomponent fibers, the bonding agent must be added to one of the polymers which will end up on an exposed surface of the fiber. In the case of sheath/core fibers this would be the sheath portion while with side-by-side fibers, the bonding agent could be added to either one or both of the polymers since they both would be exposed as an exterior surface of the fiber.

Generally, the bonding agent should be present in a weight percent of about 2 to about 20 percent of the polyolefin fiber polymer to which it is being added, based upon the total polymer weight of the blend or mix used to form that portion of the fiber. Thus in a straight polyethylene fiber, the polymer mix would constitute from about 2 to about 20 weight percent bonding agent and from about 80 to about 98 weight percent polyethylene absent their being any additional materials in the fiber polymer mix. For bicomponent or multicomponent fibers the percentages would be based upon the total weight of the mix for that particular component. In addition, if, for example, the fiber was a side-by-side polyethylene/polypropylene fiber, the bonding agent could be added to both polyolefin components, again within the same weight percentages with respect to each of the individual components, ie., from about 2 to about 20 weight percent of the total weight for each of the individual fiber polymer components.

Because it is possible to blend different types and compositions of fibers in the same nonwoven web, not all the fibers in the web need to necessarily have the bonding agent present in their exterior surfaces provided sufficient bonding between the film and nonwoven layers can be achieved such that it requires at least a 5 gram load to separate or delaminate the layers from one another. This typically should happen if at least 50 weight percent of the fibers in the fibrous nonwoven layer utilize the bonding agent in the manner described above. Lastly, in choosing the bonding agent and bonding conditions, a bonding agent should be chosen that will allow bonding at a temperature less than melting point of the polyolefin in the film layer.

To demonstrate the thermal bondability of the present invention, several samples were prepared as set forth below. Many of the samples were tested for the bond strength between the two layers as well as the water vapor transmission rate (WVTR) for the film and in Examples 4 for the composite. The test methods for calculating the WVTR and bond strength are set forth below.

Water Vapor Transmission Rate

The water vapor transmission rate (WVTR) for the sample materials was calculated in accordance with ASTM Standard E96-80. Circular samples measuring three inches in diameter were cut from each of the test materials and a control which was a piece of CELGUARD® 2500 film from Hoechst Celanese Corporation of Sommerville, N.J. CELGUARD® 2500 film is a microporous polypropylene film. Five samples were prepared for each material. The test dish was a number 60-1 Vapometer pan distributed by Thwing-Albert Instrument Company of Philadelphia, Pa. One hundred millimeters of water were poured into each Vapometer pan and individual samples of the test materials and control material were placed across the open tops of the individual pans. Screw-on flanges were tightened to form a seal along the edges of the pan, leaving the associated test material or control material exposed to the ambient atmosphere over a 6.5 centimeter diameter circle having an exposed area of approximately 33.17 square centimeters. The pans were placed in a forced air oven at 100° F. (32° C.) for 1 hour to equilibrate. The oven was a constant temperature oven with external air circulating through it to prevent water vapor accumulation inside. A suitable forced air oven is, for example, a Blue M Power-O-Matic 60 oven distributed by Blue M Electric Company of Blue Island, Ill. Upon completion of the equilibration, the pans were removed from the oven, weighed and immediately returned to the oven. After 24 hours, the pans were removed from the oven and weighed again. The preliminary test water vapor transmission rate values were calculated as follows:

$$Test\ WVTR=(grams\ weight\ loss\ over\ 24\ hours)\times 315.5\ g/m^2/24\ hrs$$

The relative humidity within the oven was not specifically controlled.

Under predetermined set conditions of 100° F. (32° C.) an ambient relative humidity, the WVTR for the CELGUARD® 2500 control has been determined to be 5000 grams per square meter for 24 hours. Accordingly, the control sample was run with each test and the preliminary test values were corrected to set conditions using the following equation:

$$WVTR=(Test\ WVTR/control\ WVTR)\times 5000\ g/m^2/24\ hrs.)\ (g/m^2/24\ hrs)$$

BOND STRENGTH

To test the bond strength between the film layer and the fibrous nonwoven comfort layer, a delamination or peel strength test was performed upon samples of the various materials. Two inch by approximately six inch samples of the material were cut and then manually delaminated at one of the short ends to produce edges which could be placed within the jaws of a Sintech®/2 Computer Integrated Testing System manufactured by MTS Systems Corporation of Eden Prairie, Minn. The jaw gap was set at a span of 100 millimeters and enough of the material was left in the laminated state so that the jaws could travel 65 millimeters. The sample was positioned in the jaws so that the sample would start delaminating before the jaws had been expanded 10 millimeters. The crosshead speed was set at 300 millimeters per minute and the data was then recorded between the 10 millimeter start point and the 65 millimeter end point. The data recorded indicated the peel strength or load necessary in grams to separate the two layers and the standard index in grams with a maximum, minimum and mean value.

EXAMPLES

Example 1

Three breathable film/nonwoven laminates were prepared and evaluated to determine the impact of the addition of a bonding agent on the water vapor transmission rate of the film and the bond strength of the overall composite. First, three breathable films with varying polymer blends were prepared and then each of the films were bonded to pieces of approximately two denier, 0.5 ounce per square yard (17 gsm) polypropylene spunbond nonwoven web material which was prebonded with a 15% bond area. Each of the film formulations contained, on a total weight percent basis, 65% English China Supercoat calcium carbonate ($CaCO_3$) with a 1 micron average particle size and a 7 micron top cut. The calcium carbonate was obtained from ECCA Calcium Products, Inc. in Sylacauga, Ala., a division of ECC International. The calcium carbonate was blended with 15–25% by weight of linear low density polyethylene made from a blend of Dowlex® 2517 linear low density polyethylene and Dowlex® 2532 linear low density polyethylene blended in a weight ratio of 1:4 such that the melt index of the blend was 10 M.I.(/10 minutes at 190° F.). The Dowlex® polymers are available from Dow Chemical U.S.A., Midland, Mich. The remaining 10–20% by weight of the formulation comprised Himont KSO51P polypropylene-based polymer from Himont, USA of Wilmington, Del. The KSO51P polymer is an olefinic thermoplastic elastomer or TPO multistep reactor product wherein an amorphous ethylene propylene random copolymer is molecularly dispersed in a predominately semicrystalline high polypropylene monomer/low ethylene monomer continuous matrix. The amorphous component acts as the tackifying or bonding agent as it begins to soften at about 55° C. As shown in Table I below, sample 1 contained 65% calcium carbonate, 10% KSO51P polymer and 25% linear low density polyethylene. Sample 2 contained 65% calcium carbonate, 15% KSO51P polymer and 20% linear low density polyethylene. The third sample contained 65% calcium carbonate, 20% KSO51P polymer and 15% linear low density polyethylene. Each of three formulations were blown into films at a melt temperature of 375° F. (191° C.) at a blow up ratio of approximately 1.7 to produce films having an unstretched gauge of approximately 1.25 mils (50 gsm). Each of the films was subsequently stretched on a machine direction orientation (MDO) unit at a stretch ratio of 3× and at a temperature of 140° F. (60° C.). The resultant films were breathable as indicated by the water vapor transmission rate data set forth in Table I below and had basis weights of approximately 14 grams per square meter.

As evidenced by the data in Table I, all three samples according to the present invention had excellent water vapor transmission rates and excellent bond strengths. The samples required a load of between 24 and 27 grams to peel apart the layers using a bond area of only 15 percent. In addition, there were no perforations of the film layer which would compromise barrier properties when using the material of the present invention as an outercover for a personal care absorbent article.

Example 2

In this example, the effect of stretching temperature was evaluated using the film formulation described with respect to sample 1 of Example 1 above. The gradual softening of the amphorous component in the KSO51P polymer as it became more adhesive-like in nature was thought to interfere with the complete fracturing of the polymer blend at the interface between the resin matrix and the surface of the calcium carbonate particles. To confirm this, samples of the film were stretched 3×, i.e. a one meter sample would be stretched to three meters, at varying temperatures between 146° F. (63° C.) and 186° F. (86° C.). As the stretching temperature increased, the water vapor transmission rate decreased, most likely because fewer and/or smaller pores were formed in the film around the calcium carbonate particles. As is shown in Table II, increasing the stretching temperature did enable more mobility of the linear low density polyethylene molecules thereby improving the ease of stretch. As the temperature was increased from 146° F. (63° C.) to 186° F. (86° C.) the ease of stretching increased. At 177° F. (81° C.) and 186° F. (86° C.) there appeared to be extreme orientation in the molecules of the film with the

TABLE I

| SAMPLE | CaCO$_3$ (% by weight) | LLDPE (% by weight) | KS051P (% by weight) | WVTR g/m$^2$/24 hr | BOND STRENGTH (grams) | FILM PROCESSING | MDO STRETCHING |
|---|---|---|---|---|---|---|---|
| 1 | 65 | 25 | 10 | 4530 | 24 | Good | Fair |
| 2 | 65 | 20 | 15 | 4300 | 27 | Good | Good |
| 3 | 65 | 15 | 20 | 3710 | 26 | Good | Excellent |

As can be seen from Table I, as the amount of bonding agent was increased, in this case the amorphous ethylene propylene copolymer portion of the Himont KS051P polymer which begins to soften at or about 55° C., the water vapor transmission rate decreased. Conversely, however, with the increase in the tackifying or bonding agent, the samples showed an increase in peel strength and thus were more resistant to delamination. Given the addition of the bonding agent, visual observations were made as to the ease of film processing and the ability to stretch the film in the machine direction. Table I indicates that film processability was good irrespective of the percentage of bonding agent added to the film preextrusion blend. In contrast however, a direct increase in stretchability was observed as the amount of bonding agent within the film was increased. In sample 1 the ability to stretch the film in the machine direction was fair while with sample 3 the stretchability was excellent. Each of the films were laminated to a 17 gsm (0.5 osy) polypropylene spunbond nonwoven web at rate of 100 feet per minute (30.5 m/min) with a nip pressure of 20 pounds per square inch (1.41 kg/cm$^2$) using a discontinuous bond pattern with a bond area of approximately 15%. The temperature of the pattern roll was maintained at 250° F. (121° C.) while the temperature of the smooth anvil roll, which was in direct contact with the film, was 160° F. (71° C.).

film thus exhibiting more splits and a greater tendency to tear in the machine direction. As a result, it can be seen that a balance of WVTR, processability and film mechanical properties can be optimized by selecting the appropriate stretching temperature. Optimum stretching and breathability is achieved when stretching is carried out at a temperature below the melting point of the primary predominately linear polyolefin polymer in the film blend and at or about the softening point of the bonding agent.

TABLE II

| Stretch Temp. °F./°C. | WVTR g/m2/24 hr | MDO Stretching |
|---|---|---|
| 146/63 | 4300 | Fair |
| 157/69 | 4100 | Good |
| 167/75 | 3960 | Good |
| 177/81 | 3730 | Splitty |
| 186/86 | 3515 | More splitty |

Example 3

In Examples 1 and 2, all the samples on a dry weight basis contained 65% calcium carbonate, from 15 to 25% linear low density polyethylene and from 10 to 20% by weight Himont KS051P polypropylene-based polymer resin which contained an amphorous ethylene propylene random copolymer as the tackifying or bonding agent. In Example 3, 65% by weight calcium carbonate and 30% by weight linear low density polyethylene were blended. As shown by Table III, to the basic blend there was added a series of recognized tackifying or bonding agents in a weight percent of 5%. The bonding agents included Regalrez® 1094, 3102 and 1126 bonding agents as well as Zonatac® 501L and Eastman® 1023PL bonding agents. In addition, the film formulation from sample 2 of Example 1 was also formed into a film in the same fashion as described with respect to Example 1. Each of the films was blown at a blow-up ratio of 1.7 to a gauge of approximately 1.5 mils (60 gsm). The films were stretched at 146° F. (63° C.) in the machine direction to three times (3×) their original length. This stretching temperature which was below the melting point (235° F./113° C.) of the predominately linear polyolefin polymers. The film samples were subsequently laminated to the same polypropylene nonwoven web described in Example 1 under the same conditions with an overall bond area of approximately 15%. The temperature of the pattern roll was maintained at 250° F. (121° C.) while the temperature of the smooth anvil roll, which was in direct contact with the film, was run at temperatures of 160° F. (71° C.), 175° F. (79° C.), 185° F. (85° C.) and 195° F. (9° C.). The bond strength was measured for each film/nonwoven laminate at each of the four bonding temperatures. In addition, the water vapor transmission rate for the each of the films was measured and the ease of film processing and stretching were visually observed. The results are presented in Table III below.

control outercover and with a film/nonwoven laminate according to sample 2 of Example 1. The film layer of the composite had a water vapor transmission rate (WVTR) of 4300 g/m$^2$/24 hrs. and the composite had a WVTR of 4100 g/m$^2$/24 hrs. The single layer 1.2 mil thick polyethylene film of the control diaper had a WVTR of approximately 40–50 g/m$^2$/24 hrs.

Each of the diapers was insulted with 60 milliliters of synthetic urine and then secured about the forearms of the test participants. At predetermined time intervals the water loss was measured to determine the level of skin hydration. Based upon the test results, the skin hydration of the wearers' skin underneath the diaper using the composite of the present invention was determined to be significantly lower than the control diapers thereby demonstrating that effective bonding between the layers could be achieved while still maintaining breathability and reducing skin hydration.

As can be seen from the foregoing examples, the materials of the present invention provide a breathable, cloth-like film/nonwoven composite with good adhesion between the layers. The nonwoven layer acts to reinforce the thin breathable film layer and, when the composite is used as an outercover on a personal care absorbent article such as a diaper, the nonwoven layer helps overcome the cold, clammy nature of the breathable film. Furthermore, due to the incorporation of the bonding agent into the film and/or fiber polymer blend, it is possible to thermally laminate otherwise incompatible polymers/layers to one another.

Having thus described the invention in detail, it should be apparent that the various modifications and changes can be

TABLE III

| Bonding Agent | CaCO$_3$ Wt % | LLDPE Wt % | WVTR g/m$^2$/24 hr | Bond Strength (grams) | | | | Film Processing | MDO Stretching |
|---|---|---|---|---|---|---|---|---|---|
| | | | | 160° F. | 175° F. | 185° F. | 195° F. | | |
| KS050 | 15% | 65% | 20% | 4300 | 41 | * | * | * | Good | Fair |
| Regalrez® 1094 | 5% | 65% | 30% | 2300 | 3 | 5 | 6 | 10 | Excellent | Excellent |
| Regalrez® 3102 | 5% | 65% | 30% | 3840 | 3 | 3 | 7 | 5 | Excellent | Excellent |
| Regalrez® 1126 | 5% | 65% | 30% | 3198 | 3 | 3 | 5 | 7 | Good | Good |
| Zonatac® 501L | 5% | 65% | 30% | 2990 | 4 | 4 | 10 | 9 | Excellent | Excellent |
| Eastman® 1023PL | 5% | 65% | 30% | 4900 | 8 | 7 | 10 | 7 | Good | Good |

*could not be separated (well bonded)

The Himont KS050 bonding agent gave the best bond strength between the two layers but it should be noted that is comprised 15 weight percent of the film while the other bonding agents only comprised 5 weight percent. Most of the bonding agents appeared to provide increased bonding as the bond temperature was increased but some of the bonding agents peaked at 185° F. and then began to taper off in bond strength at 195° F. Film processing was good to excellent with all bonding agents but the machine direction stretching of the film using the Himont KS050 bonding agent was only fair. All films showed good water vapor transmission rates.

Example 4

In Example 4 a clinical study was done to determine the effectiveness of reducing skin hydration using the breathable, cloth-like film/nonwoven composite of the present invention as a diaper outercover in lieu of normal polyethylene film (control). Diapers were made with the made to the present invention without the departing from the spirit and scope of the following claims.

I claim:

1. A personal care absorbent article comprising:
a body side liner and an outercover with an absorbent core disposed therebetween, said outercover comprising a film formed from a blend including, on a dry weight basis, based upon the total weight of the film, from about 10 to about 68 percent of a predominately linear polyolefin polymer, from about 30 to about 80 percent of a filler and from about 2 to about 20 percent of a bonding agent, said film having a water vapor transmission rate of at least 100 g/m$^2$/24 hours, and a fibrous polyolefin nonwoven web bonded directly to said film to form a laminate, said laminate having a peel strength of at least 24 grams.

2. An article of clothing including a breathable film/nonwoven laminate which comprises:

a film formed from a blend including, on a dry weight basis, based upon the total weight of the film, from about 10 to about 68 percent of a predominately linear polyolefin polymer, from about 30 to about 80 percent of a filler and from about 2 to about 20 percent of a bonding agent, said film having a water vapor transmission rate of at least 100 g/m$^2$/24 hours, and a fibrous polyolefin nonwoven web bonded directly to said film to form a laminate, said laminate having a peel strength of at least 24 grams.

3. A process for forming a breathable film/nonwoven laminate comprising:

forming a pre-extrusion blend including, on a dry weight basis, based upon the total weight of the film from about 10 to about 68 percent of a predominately linear polyolefin polymer, from about 30 to about 80 percent of a filler and from about 2 to about 20 percent of a bonding agent, forming a film from said preextrusion blend, stretching said film at a temperature less than the melting point of said predominately linear thermoplastic polymer, and bonding said film directly to a fibrous polyolefin nonwoven web at a temperature less than the melting point of said predominately linear thermoplastic polymer in said film to form a laminate having a peel strength of at least 24 grams.

4. The process of claim 3 which further includes causing said laminate to retract to produce an undulating surface on said laminate.

5. The process of claim 3 wherein said stretching step is carried out at a temperature which is also at or about the softening point of said bonding agent.

6. A process for forming a film/nonwoven laminate comprising:

forming a film layer including, on a dry weight basis based upon the total weight of the film, from about 30 to about 80 percent filler and from about 20 to about 70 percent polyolefin polymer, stretching said film layer, bonding a fibrous nonwoven web directly to said film layer by a plurality of fibers within said fibrous nonwoven web which contain a polyolefin polymer and a bonding agent, said polyolefin polymer and said bonding agent being present on at least a portion of an exterior surface of said fibers to create a peel strength of at least 24 grams.

* * * * *

UNITED STATES PATENT AND TRADEMARK OFFICE
CERTIFICATE OF CORRECTION

PATENT NO. : 5,855,999

DATED : January 5, 1999

INVENTOR(S) : Ann Louise McCormack

It is certified that error appears in the above-indentified patent and that said Letters Patent is hereby corrected as shown below:

Column 15, Line 26, "9° C" should read -- 91° C --

Signed and Sealed this

Sixth Day of June, 2000

Attest:

Q. TODD DICKINSON

*Attesting Officer*      *Director of Patents and Trademarks*

UNITED STATES PATENT AND TRADEMARK OFFICE
CERTIFICATE OF CORRECTION

PATENT NO. : 5,855,999  
DATED : January 5, 1999  
INVENTOR(S) : Ann Louise McCormack Page 1 of 1

It is certified that error appears in the above-identified patent and that said Letters Patent is hereby corrected as shown below:

Column 3,
Line 21, "overcome by the" should read -- overcome by --

Column 4,
Line 8, "and liner low" should read -- and linear low --

Column 6,
Line 57, "at least 5°F." should read -- at least 5°C. --

Column 7,
Line 28, "Company Longview," should read -- Company of Longview, --

Column 12,
Line 18, "(32°C) an" should read -- (32°C) and --
Lines 26-27, the formula should appear exactly as follows:
    -- WVTR    =(Test WVTR/control WVTR) x 5000 g/m$^2$/24 hrs
      (g/m$^2$/24 hrs) --
Line 38, the bolded "100" should read unbolded -- 100 --

Column 13,
Line 19, the bolded "KS051P" should read unbolded -- KS051P --
Line 45, the bolded "KS051P" should read unbolded -- KS051P --

Column 15,
Line 17, "which was below" should read -- was below --

Signed and Sealed this

Thirtieth Day of July, 2002

*Attest:*

*Attesting Officer*

JAMES E. ROGAN  
*Director of the United States Patent and Trademark Office*